United States Patent Office 3,219,077
Patented Nov. 23, 1965

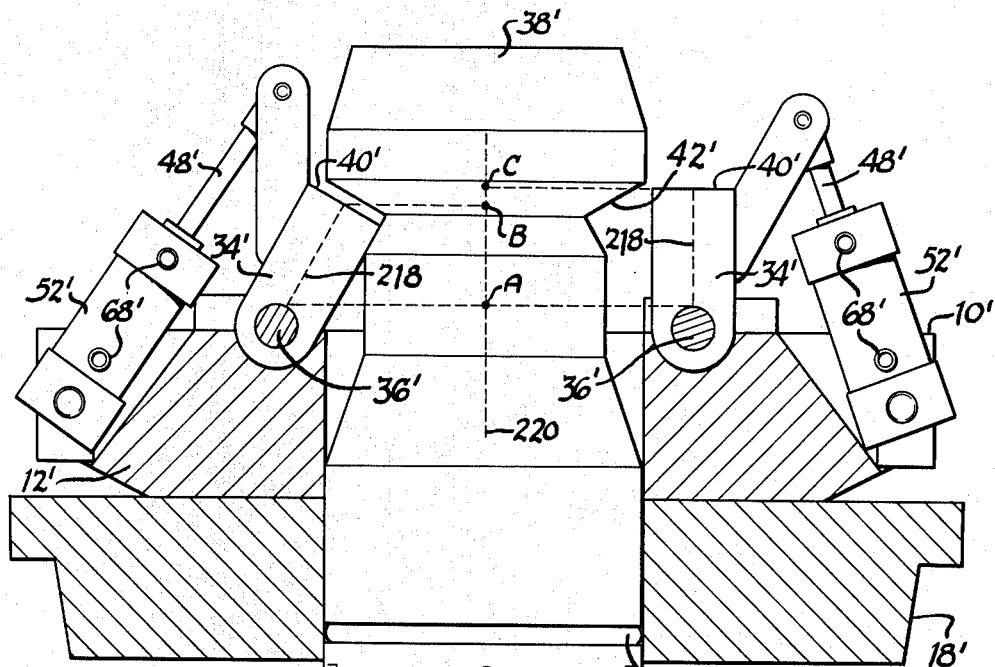
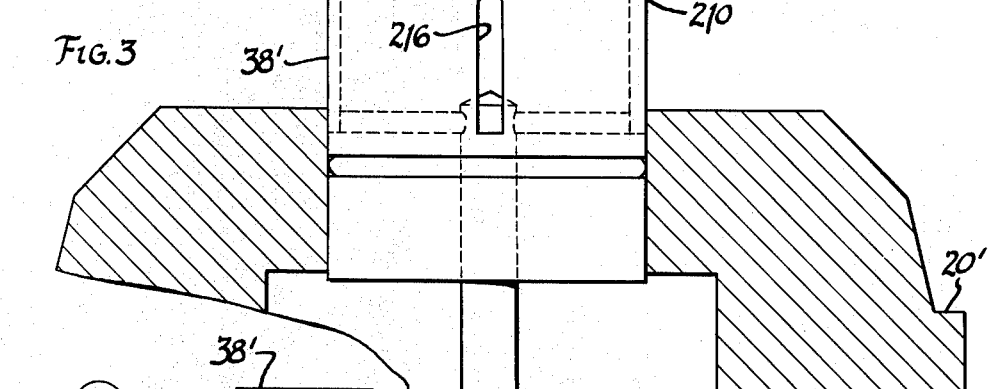
FIG. 3
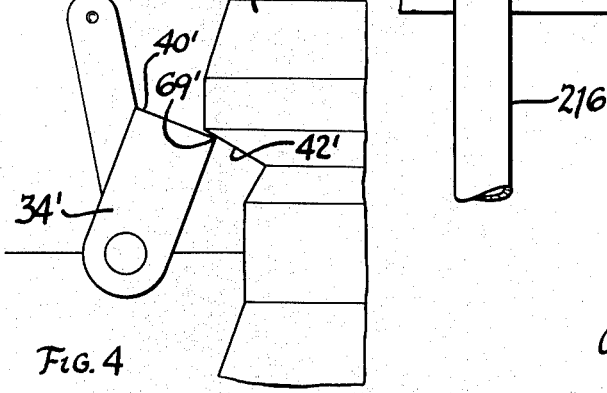
FIG. 4
INVENTOR.
ROBERT WILLIAM WRIGHT
BY
WILSON, SETTLE & CRAIG
ATTORNEYS

3,219,077
TIRE CHUCK
Robert William Wright, Detroit, Mich., assignor to Firwood Manufacturing Company, Dearborn, Mich., a corporation of Michigan
Filed Nov. 21, 1962, Ser. No. 239,311
9 Claims. (Cl. 144—288)

This invention relates to a tire holding chuck on which tires can be mounted and inflated and more particularly to an improved chuck assembly having a locking mechanism operable by axial shifting of relatively movable tire bead engaging members which locking mechanism must be locked before air can be introduced into a tire mounted on the chuck.

There are many instances in tire manufacturing when it is desirable to mount and inflate tires. For example, tires are removed from curing molds at elevated temperatures. As the tire cools to room temperature, the cord in the tire carcass tends to shrink, thus causing undesirable characteristics in the tire. Shrinking can be stopped if the tire is inflated while it cools. This inflation process is known as post-inflation. Tire inflation is also used to facilitate sidewall grinding and buffing or thump testing.

An object of my invention is therefore to provide an improved chuck having automatically operable dogs or locking members rotatable to a secure locked position before it is possible to introduce air into a tire mounted on my improved chuck.

Another object of my invention is to provide a novel tire supporting chuck having spaced tire bead engaging rings operable, upon predetermined movement of the bead engaging rings toward each other, to actuate a locking mechanism to securely hold the chuck in assembled relation.

Yet a further object of one form of my invention resides in the provision of a locking mechanism positioned within bead carrying rings to clamp the rings securely in assembled relation while the tire is inflated. More specifically, it is an object to have the chuck, with its assembled tire, form a container for fluid under pressure, and to have the locks or locking members and the operating means therefor all contained within this container so that the tire can be revolved or otherwise moved, while inflated, to change its condition, for example to hold the cords stretched while the temperature is being reduced, or to buff or grind the tire.

It is another object to provide telescoping chuck halves each provided with some form of force-sustaining abutment means, the abutment means on one half being passable through the abutment means on the other half, so that separation of the halves requires the two abutment means to approach each other. Force tending to separate the halves is then resisted by locking means or blocking means placed between the abutment means after the halves are telescoped, so that the locking means sustains force exerted by one abutment means toward the other abutment means.

Another object is to provide compression struts for locking the two chuck halves together so that small locking parts (the struts) can securely hold the chuck assembled notwithstanding the very large forces created by high air pressure in the chuck and tire, which often form a pressure container of large diameter.

Another object of my invention is to provide a locking mechanism having a fluid pressure actuated piston movable in a cylinder to shift locking dogs carried by one chuck member to engage a locking surface formed on the other chuck member to prevent separation of the chuck members until the tire has been deflated to such a degree that the chuck members may be moved toward each other. This object may be carried out, for example, by providing pivoted dogs having a locking surface on each dog, which surfaces, when the dogs are in locking position, are parallel to a locking surface on the other member, and so pivoting the dogs that the corners or ends of their locking surfaces must be cleared by movement away from them of the locking surface on the other member. The tire beads must be moved toward each other (against any pressure in the tire) to permit such clearing movement.

Still a further object of my invention resides in the development of a locking dog construction carried by axially movable chuck members operable in such a manner that when the locking dogs carried by one chuck member engage their seat members carried by the other chuck member, the locking dogs are subjected to a camming action which moves them to the fully engaged position.

Yet a further object of my invention is to provide an improved tire carrying chuck for supporting a tire in such a manner that the chuck cannot be released until the tire is completely deflated.

More specifically stated, it is an object of the invention to provide compression struts for holding apart two abutments which tend to approach each other as the chuck halves separate and to slope the compression struts when in locked position so that the projection of each strut onto the path travelled by one of the abutments during relative movement of the chuck halves must lengthen as the struts are moved toward unlocked position. In this way the abutment is held by tire pressure in the path of pivoting of the lock, and pressure in the tire positively prevents movement of the lock out of locked position.

A further object of my invention resides in the provision of a movable rod for indicating when the locking mechanism of a tire engaging chuck has been moved to its locking position and when it is in the lock disengaged position.

Still another object is to provide locking struts which, if inadvertently placed in partial engaging position before tire inflation, will move to full engagement upon tire inflation.

Another object of my invention is to provide an improved chuck for mounting and inflating tires which may be rotated with the inflated tire in position thereon.

Other objects of this invention will appear in the following description and appended claims, reference being had to the accompanying drawings forming a part of this specification wherein like reference characters designate corresponding parts in the several views.

FIGURE 3 is a schematic section of another modified form of the invention, the section being in two parts to show two positions of the locking mechanism;

FIGURE 4 is a diagram corresponding to a portion of FIGURE 3 showing the relationship of locking surfaces in an intermediate position between the positions shown in FIGURE 3.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

My improved tire holding chuck may be used for a wide variety of purposes including the post-inflation of tires, and the mounting of tires to permit various operations to be performed thereon. It locks automatically when relatively movable members are shifted toward each other to a predetermined position to sequentially engage the beads of the tire on the tire bead supporting members, clamp the tire supporting members together, and thereafter to inflate the tire to a predetermined pressure. The tire supporting members may be shifted toward each other in any desired manner for example by any suitable post-inflating machine, such as the one disclosed in the copending application filed by me on December 10, 1959 jointly with Donald E. Erickson and Edward B. Erickson. This is Serial No. 858,775.

The post-inflation of tires is a step in the manufacture of tires whereby the tires are released from the molding machine while they are still very hot and are therefore pliable. The tires are quickly mounted on tire supporting members and are inflated to a pressure considerably above the pressures to which the tires are normally inflated while they still retain a high temperature from the molding operation. In carrying out this process it is important that the tire be quickly chucked and inflated after removal from the mold to stretch the tire while still hot to relieve internal stresses and to permit it to cool under the inflated condition.

Figure 1:
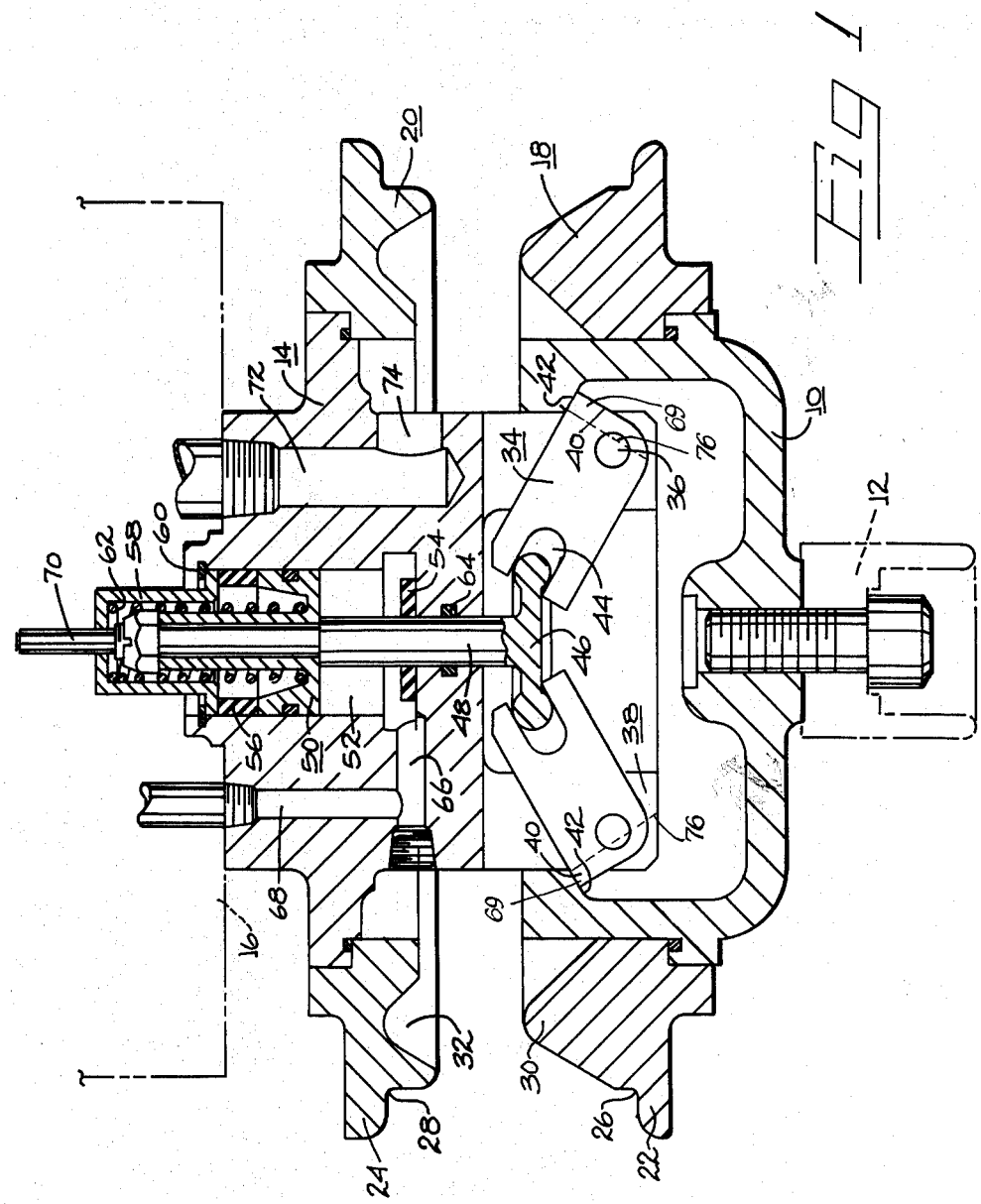
FIGURE 1 is a sectional view of a chuck mechanism embodying my invention.

Referring now more particularly to FIGURE 1, it will be noted that a lower chuck body 10 may be supported in any desired manner as on a yoke member 12 adapted to be moved vertically by any convenient motion transmitting device. The yoke may form part of the post-inflation machine. An upper chuck body 14 may be supported in any convenient manner as by being suspended from a structural member 16 which may be part of the post-inflating machine so that the upper chuck body 14 may be held stationary while the lower chuck body 10 is moved vertically to an operative position relative thereto.

The lower and upper chuck bodies 10 and 14 are provided with lower and upper tire bead supporting rings 18 and 20. It will be noted that the lower and upper rings 18 and 20 have radial flanges 22 and 24 respectively providing tire bead supporting shelves 26 and 28. If desired the body sections of the rings 18 and 20 may be contoured to provide concave and convex configurations 32 and 30 whereby the rings 18 and 20 may telescope into each other to a substantial degree to position the bead supporting shelves 26 and 28 closely adjacent each other to insure more positive engagement of the beads of tires which it is desired to inflate, and which may only recently have been removed from the tire molds and which may therefore be hot and pliable.

Figure 2:
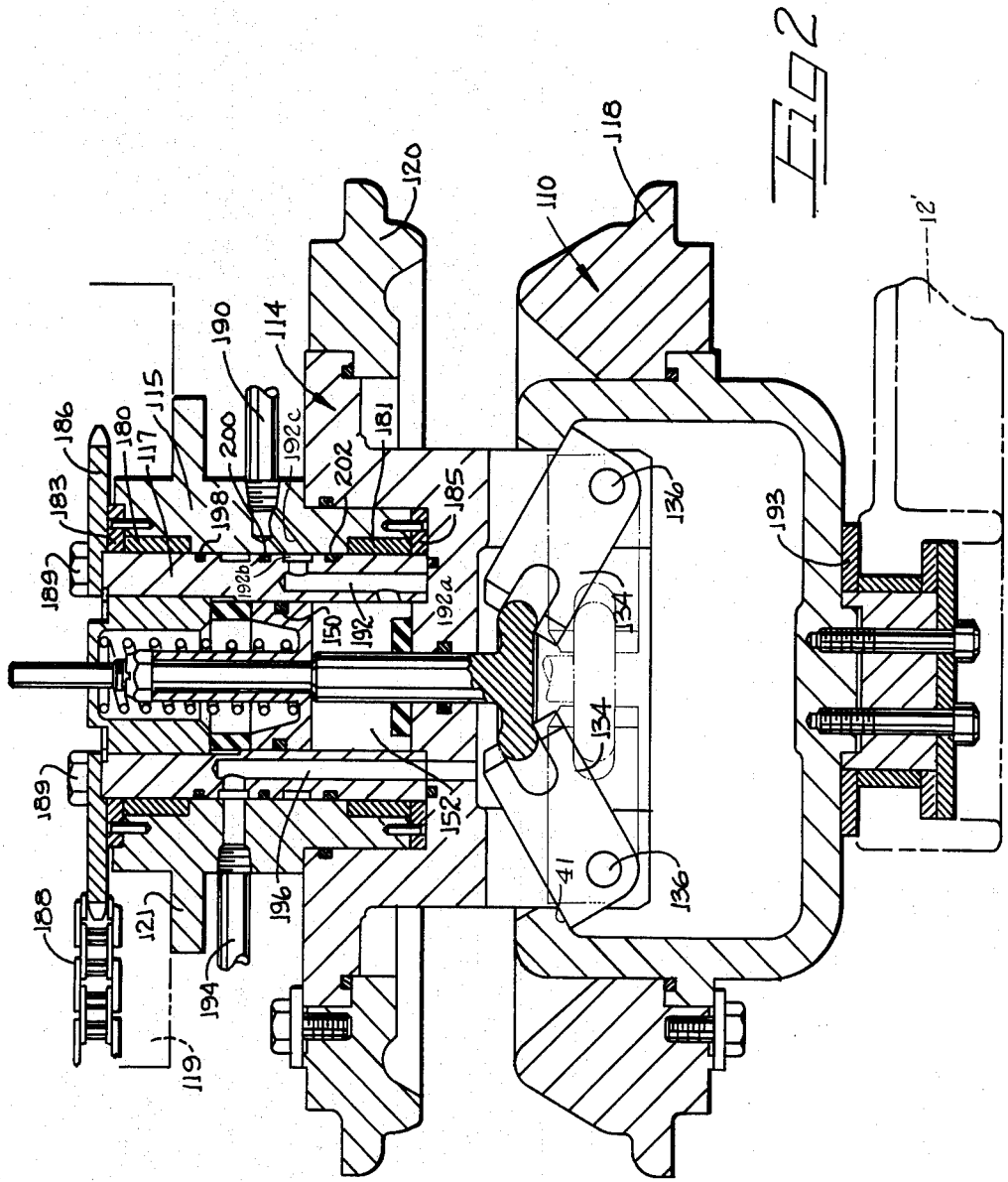
FIGURE 2 is a view similar to FIGURE 1 illustrating a modified form thereof.

I have found that a plurality of circumferentially spaced locking dogs 34 including load bearing portions serving as struts or compression elements mounted on pivots 36 in a cylindrical portion or boss 38 of the upper chuck body 14 provides a desirable locking mechanism. This boss forms, in effect, a circular series of pivot supports for the pivots 36. The locking ends 40 of the dogs 34 have locking surfaces 41 which engage behind, or in the path of an angularly inclined or conical locking surface 42 formed as a conical shoulder on the lower chuck body 10. The surfaces 41 are shown in FIGURE 2. The inner ends of the locking dogs 34 are preferably provided with radially extended slots 44 which receive a dog actuating operator 46 carried by a lock actuating piston rod 48. The rod 48 is slidably mounted in the upper chuck body 14, and has an actuating piston 50 secured thereto which is slidably mounted in a cylinder 52 formed in the upper end of the upper chuck body 14. The piston and cylinder form of a fluid pressure motor for moving the dogs to locking position and holding them there.

A resilient bumper 54 is preferably interposed between the lower surface of the piston 50 and the central portion 38 of chuck body 14 at the bottom of the cylinder 52. A second resilient bumper 56 is interposed between the upper end of the piston 50 and a cap 58 which is secured in the upper end of the cylindrical portion 38 of the chuck body 14 in any desired manner as by snap ring 60.

It will be noted that the cap 58 houses a spring 62 to engage the piston 50 and yieldingly urge it downwardly as viewed in FIGURE 1 toward the unlocking position. Suitable packing 64 carried by the cylindrical portion 38 of the chuck body 14 is provided to engage the piston rod 48 to prevent the escape of fluid under pressure from the cylinder 52.

Fluid, such for example as air under pressure, may be admitted to the cylinder 52 beneath the piston 50 through interconnected passages 66 and 68 from a suitable source of fluid pressure to force the piston 50 upwardly in the cylinder 52 to move the rod 48 and camming member 46 to rotate the locking dogs 34 about their pivots 36 to move the locking ends 40 of the dogs 34 into obstructing positions relative to the locking surface 42 of the lower chuck ring 10. The bumper 56 forms a stop which, when the motor is pressurized prevents rotation of the dogs in the locking direction beyond the position in which the locking surfaces 41 are parallel to the conical locking surface 42 as is shown in FIGURE 1.

A valve mechanism may be provided to supply air under pressure into the cylinder 52 automatically when the chuck rings 10 and 14 have moved in the telescoping direction to a point where the upper corner of the surface 42 has passed above the ends 40 of the dogs 34. When fluid pressure is thus exerted in the cylinder 52, the piston 50 is urged upwardly to elevate the piston rod 48 and the locking ring 46 to rotate the dogs 34 about the pivots 36 into the locking position. Due to the clearance necessary for rotation, the dogs 34 must be separated a small distance from the surface 42 at this point. When the dogs are in locking position with their load bearing surfaces 41 parallel to the surface 42 the corners 69 are at their maximum axial distance from the ring 20, or from the central plane of the tire. Before the dogs can be rotated to unlocked position or before the dogs can be rotated from unlocked position to the position shown in FIGURE 1, the corners 69 must move their positions closer to the central plane of the tire than shown in FIGURE 1. Consequently, to lock or unlock the chuck the member 12 must first move the chuck half 10 closer to the chuck half 14 than is shown in FIGURE 1. The chuck member 10 is subsequently moved back into clamping engagement with the dogs by the outward pressure of the walls of the inflated tire.

Upward movement of the piston rod 48 to rotate the dogs 34 to the clamping position elevates the rod 70 above the cap 58 to provide a visual indication that the locking mechanism has been actuated, and that it is then safe to introduce air through the passageways 72 and 74 to the space between the bead supporting rings 18 and 20 to inflate the tire to the desired pressure.

It will be apparent that, if desired, a valve controlling the admission of air under pressure to the passageways 72 and 74 may be actuated by upward movement of the rod 70 so that the tire is automatically inflated as soon as the locking mechanism has been actuated and the locking dogs 34 have been rotated to the engaging position with reference to the locking surface 42 of the lower chuck ring 10.

Attention is directed to the fact that as soon as the actuating ends 40 of the dogs 34 move into engaging position with the locking surface 42 it is safe to inflate the tire. As the tire is inflated and the lower and upper tire supporting rings 18 and 20 move apart, if by any chance the dogs have not been moved fully out, so that their upper or locking surfaces are not accurately parallel to the conical surface 42, then the force exerted on the dogs 34 by the locking surface 42 rotates the dogs 34 still further about the pivots 36 until surfaces 41 are parallel to 42 to more securely clamp the chuck members 10 and 14 together.

The operation is as follows. When a tire is to be clamped in the chuck, the member 46 is lowered to rotate the locking struts to unlocked position out of the path of the conical locking surface 42. This permits the lower chuck half 10 to be slid off the boss 38 of the upper chuck half and to be separated therefrom. Then a tire is positioned over the lower bead supporting ring 18 and the convex surface 30 thereof will guide the tire to position its bead on the bead supporting shelf 26. The lower chuck body 10 may then be slid onto the boss 38 of the upper chuck body 14, manually or by any suitable post-inflating machine. Then the upper bead of the tire moves into engaging relation with the bead supporting shelf 28 adjacent the outer flange 24 of the upper chuck body 14. The convex section 30 of the lower tire supporting ring 18 is telescoped into the concave portion 32 of the upper tire supporting ring 20 to insure intimate engagement of the beads of the tire with the bead supporting rings 18 and 20. In this position the surface 42 will clear the corners 69.

It will be noted that when fluid pressure is not applied to the cylinder 52, the piston 50 and the piston rod 48 are urged downwardly by the spring 62 to position the dogs 34 in a horizontal position. In this position the lockings ends 40 of the dogs 34 are positioned out of the path of shoulder 42 to slide freely through the central opening of the lower chuck body 10 formed by this shoulder.

As the lower chuck body 10 is moved upwardly on the boss 38 by yoke 12 a valve mechanism may be triggered to apply fluid pressure in the cylinder 52 whereupon the piston rod 48 and locking ring 46 are urged upwardly to rotate the locking dogs 34 toward the locking position. As the outer ends 40 of the dogs 34 move into the path of the locking surface 42, the piston 50 continues to move upwardly in the cylinder 52 whereupon the dogs 34 are rotated to place the surfaces 41 substantially parallel to the surface 42. In the strict geometrical sense a plane surface like 41 cannot be parallel to a conical surface such as 42. But the plane surface can be parallel to an element of the conical surface. In geometrical terminology an element of a cone, or of a conical surface, is a straight line through the apex and intersecting the circumference of the base. All such possible lines determine the surface. In other words the conical surface is the locus of an element pivoting about the apex.

In the claims herein I define the surfaces 41 as substantially parallel to the conical surface 42. This can be effected by the foregoing geometric conditions. As previously stated, upward movement of the rod 70 as the dogs 34 are rotated to the clamping position may actuate a valve to introduce air under pressure through the passageways 72 and 74 thereby introducing air under pressure between the tire supporting rings 18 and 20 and inflating the tire.

The tire is retained in the inflated position on the chuck until it cools. The cords of the tire are thus prevented from shrinking, maintaining the proper cord length throughout the tire carcass.

It will of course be understood that my improved chuck can be used in any instance where it is desired to mount and inflate a tire. When the tire has been inflated for the desired period of time and it is desired to deflate it and remove it from the chuck, the valve mechanism controlling the inlet of air through the passageway 72, 74 is released, whereupon air is permitted to escape from the tire. When the tire has been fully deflated and the air pressure in the cylinder 52 has been reduced to atmospheric pressure the spring 62 can move the piston 50 downwardly in the cylinder 52 to rotate the dogs 34 to pull the locking ends 40 inward. When the piston rod 48 has been moved all the way down and the dogs 34 are disposed horizontally with their actuating ends 40 out of engagement with the locking surface 42, the lower chuck 10 may be lowered and the tire removed from the bead supporting ring 18.

It will be noted that in order for the actuating end 40 of the locking dogs 34 to move out of locking position relative to the locking surface 42 of the lower chuck ring 10, it is necessary that the lower and upper chuck members 10 and 14 move toward each other a small distance sufficient to permit the corners 69 to move upwardly and yet clear the locking surface 42. It will thus be apparent that when a tire has been positioned on the tire supporting rings 18 and 20 it is impossible for the members to separate until the chuck members 10 and 14 have first moved toward each other a short distance sufficient to permit the inner ends of the locking dogs 34 to rotate downward as viewed in FIGURE 1 to move the outer ends 40 to clear the locking surface 42 of the lower chuck ring 10. A highly efficient safety feature is thus provided since it is impossible to release the device while an inflated tire is positioned thereon because of the separating force exerted on the chuck members 10 and 14 by any appreciable pressure within the tire which exerts a force on the locking struts tending to hold them in locking position which is greater than any unlocking force which can be exerted by the spring 62.

Since any substantially flat surface, such as the surface 42, exerts force on a second surface in contact with it, such as the surface 41, which force is principally in a direction perpendicular to such flat surface, it follows that the locking surface 42 exerts forces on the locking struts parallel to the lines 76 which are perpendicular to surface 42. This loads the locking portions or struts principally in compression and the struts sustain the force of air pressure in the tire mainly by compressive forces in the struts. This is an advantage over arrangements in which locking members are loaded in tension, shear, or bending.

The embodiment of the invention illustrated in FIGURE 2 is similar in many respects to that illustrated in FIGURE 1. Corresponding parts have therefore been given corresponding reference numerals with the addition of one hundred.

The FIGURE 2 embodiment differs from the FIGURE 1 embodiment in that means are provided for rotation of the chuck. Chuck rotation is useful when it is desired to change the condition of the tire or perform an operation on the tire other than post-inflation. For example, it may be desired to change the condition of the tire by quickly and uniformly cooling the tire by means of a water spray directed onto the tire as it revolves. In other instances it may be desirable to buff, grind or brush the sidewalls or to thump test as the tire rotates. These latter operations may be carried on after the tire has cooled.

In the FIGURE 2 embodiment, the upper chuck body 114 is provided with an axle member 117 which is rotatably journalled within a hollow stationary housing 115. The housing 115 is secured to a stationary support 119 by means of the circumferential flange 121. The axle 117 is journalled within the housing 115 by means of radial bearings 180, 181. Thrust bearings 183, 185 are provided at the upper and lower ends of the housing 115 to provide for the rotation of the upper chuck body 114 and a sprocket 186 which is carried on the axle 117. Bolts 189 extend through the sprocket and axle into threading engagement with the upper chuck body 114. Consequently, when the sprocket is driven by the chain 188, the axle and upper chuck body 114 will rotate as a unit. The lower chuck ring 110 is pivotally mounted by means of suitable bearings 193 on the arm 12' of any suitable post-inflating machine and is rotatably driven along with the upper chuck body through the tire secured therebetween as a result of the frictional engagement of the tire beads.

Air under pressure is directed into the piston cylinder 152 through opening 192a connected to passageway 192 which, through gland or annular groove 192b and hole 192c communicates with the conduit 190 which is connected to air under pressure. As previously discussed, the piston 150, when subjected to fluid pressure, is urged upwardly to actuate the locking dogs 134 pivotally mounted at 136 in the lower chuck ring 110.

A tire mounted on the bead supporting rings 118 and 120 is inflated by means of air under pressure supplied through the conduit 194 which communicates through passageways 196 with the space between chuck members 110 and 114. O-rings 198, 200 and 202 are provided to effect air-tight engagement between the axle and axle housing adjacent the air inlet openings.

Instead of having the locking dogs 34 on the inside of the chuck for engagement with a hollow conical locking surface 42 inside the chuck it is within the scope of my invention to place the locking dogs outside the chuck and have them engage an extended form of the boss 38. FIGURE 3 shows schematically this alternative form of the invention.

Referring to FIGURE 3, a tire bead supporting ring 20' is attached in any suitable manner to the center post 38' which corresponds to the boss 38 of FIGURE 1. This post passes through the second bead supporting ring 18' which corresponds to ring 18 in FIGURE 1. The post is sealed to the ring by an elastic O-ring 210. The centerpost has a circumferential notch, one side of which forms a male conical locking surface 42' corresponding to the female conical locking surface 42.

Locking dogs 34' are mounted on shafts 36' pivoted on a ring or plate 10' which forms part of the chuck half which includes ring 18'. Each locking dog is moved from locked position to unlocked position by a piston rod 48' connected to a piston travelling in a cylinder 52'. When air under pressure is admitted above the piston into the top of the cylinder 52' as FIGURE 3 is seen, the piston moves down to move the dog to unlocked position as shown on the right side of FIGURE 3. When air is admitted to the bottom of the cylinder the piston moves up to move the dogs to the locking position as shown on the left side of FIGURE 3.

The operation of each locking dog 34' with respect to the locking surface 42' is the same as described above in connection with the locking dogs 34 and the locking surface 42 in the modification of FIGURE 1. Air is admitted to the cylinders 52' and exhausted therefrom by suitable conduits 68' and the apparatus is provided with any suitable controls, not shown, supplying air to one conduit 68' of a cylinder while exhausting the air pressure from the other conduit 68' of the same cylinder. The conduits 68' constitute means for selectively pressurizing the ends of the cylinders.

Figure 5:
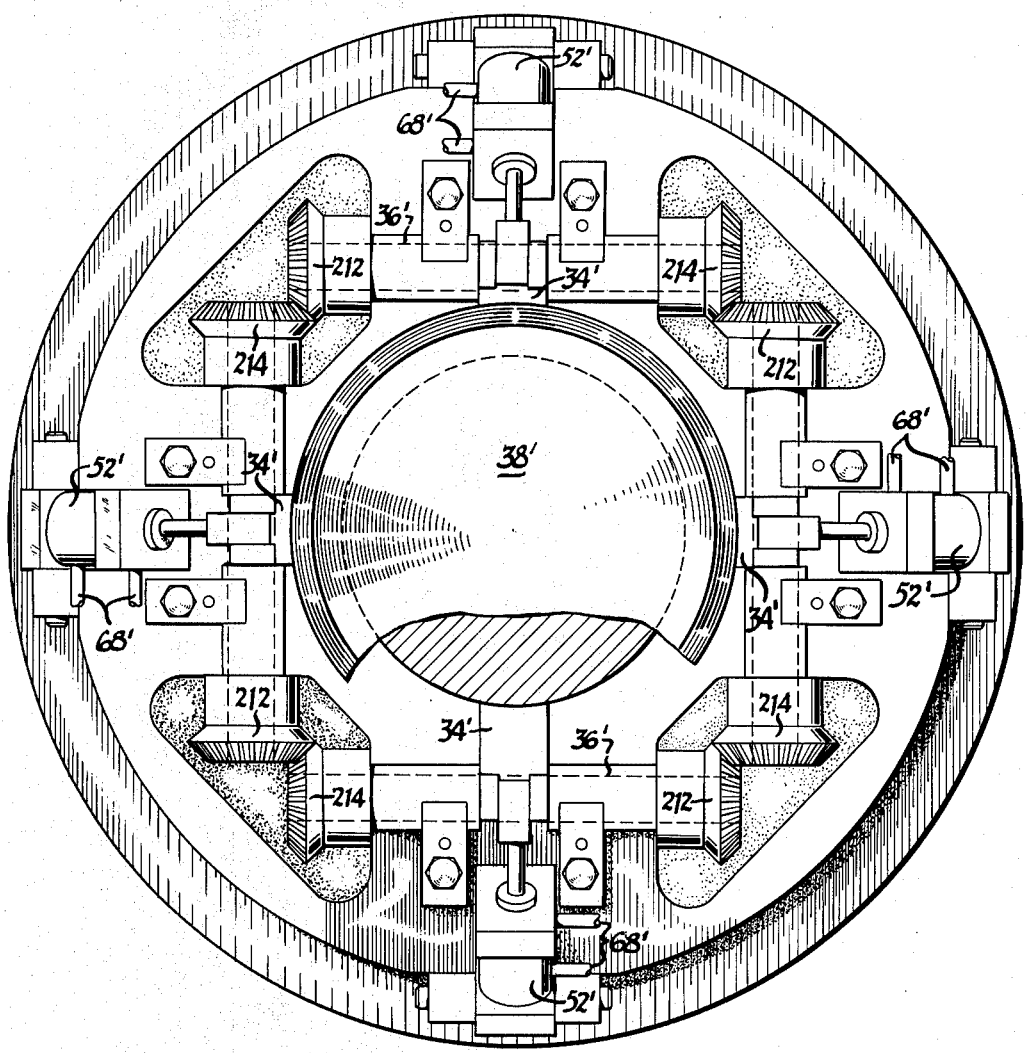
FIGURE 5 is a structural plan partly in section of the form shown in FIGURE 3.

As shown in FIGURE 3, there are four locking dogs 34' each operated by a cylinder 52'. In order to ensure identical positioning of the four locking dogs, the four shafts 36' are geared together by pairs of meshing bevel gears 212 and 214, each pair being secured to one of the shafts, as shown best in FIGURE 5.

It is contemplated that the chuck halves will be telescoped by the passage of the center post 38' through the tire ring 18' and the tire rings 18' and 20' will be brought together by any suitable means corresponding to the arm 12 in FIGURE 1. When this occurs, the center post will be in the position shown in FIGURE 3 and the locking dogs 34' will be in unlocked position as shown in the right half of FIGURE 3. Thereafter, the lower ends of the cylinders 52' will be pressurized by the appropriate conduits 68' and the locking dogs will be moved into the locked position shown on the left side of FIGURE 3. There is enough clearance between the surface 42' and the dogs to permit their corners 69' to rotate into locking position. Thereafter, the tire will be pressurized by admitting air through the passage 216 and the tire bead rings will move apart, moving the center post down to place the locking surface 42' against the locking surfaces 40' of the locking dogs, see FIGURE 4. If it should happen that the tire were pressurized while the locking dogs are in an intermediate position as shown in FIGURE 4, the locking surfaces 42' would contact the corners 69' of the locking dogs and this would prevent separation of the tire bead ring, and the separating force due to pressure in the tire would cause the sloping surface 42' to force the locking dogs into position parallel with it, that is into the fully locked position shown on the left side of FIGURE 3.

In FIGURE 3 the length of the load-bearing portion of the locking dog is represented by the broken line 218. The line 220 represents the path of movement of the center post with respect to the ring 18' during relative movement of the rings. The projection of the line 218 on the line 220 when the dogs are in locking position has a length AB and the projection of the line 218 on the line 220 when the dogs are in unlocked position has a greater length AC. Consequently, the length of this projection must increase as the dogs move from locking to unlocking position. This requires that the tire rings be made to approach each other momentarily before the dogs can be unlocked in order to provide clearance between the locking surface 42' and the corners 69' of the locking dogs. This arrangement prevents unlocking of the chuck while there is any air pressure in the tire, because the mechanism 12' which separates the chuck halves cannot be moved against this air pressure to provide this clearance.

This application is a continuation-in-part of my earlier filed application, Serial No. 797,705, filed March 6, 1959, now abandoned.

I claim:

1. A tire inflation support comprising in combination a pair of separable telescoping chuck ring members movable toward each other into a locking position for holding a tire and movable away from each other for releasing the tire, means for supplying pressure fluid to the tire, a hollow conical locking surface forming part of the first member, locking means secured to the second member, said locking means including locking members having locking portions mounted on pivots on the second member radially inside the path travelled by the conical surface during relative movement of the chuck ring members, and means for rotating the locking members to place the locking portions thereof in the path of the conical surface and between the conical surface and the pivots to prevent separation of the chuck ring members by pressure in the tire.

2. A tire inflation support comprising in combination a pair of separable telescoping chuck ring members movable toward each other into a locking position for holding a tire and movable away from each other for releasing the tire, means for supplying pressure fluid to the tire, a first hollow conical locking surface forming part of the first member, locking means secured to the second member, said locking means including locking members having locking portions mounted on pivots on the second member radially inside the path travelled by the conical surface during relative movement of the chuck ring members and having second locking surfaces and means for rotating the locking members to place the second surfaces in the path of the conical surface and substantially parallel to the conical surface to prevent separation of the chuck ring members by pressure in the tire.

3. A support for movably supporting a tire while inflated under pressure comprising in combination a pair of telescopable members including a first member having a tire-bead-supporting ring and having pivot supporting means for locking struts, the pair including a second member having a tire-bead-supporting ring and a bowl-shaped element having an inwardly projecting shoulder slidable on said pivot supporting means and having a hollow conical locking surface, said members being adapted to hold a tire between said rings, means for supplying pressure fluid to one of said members, said supply means and said members when a tire is held between the rings forming a container for pressure fluid, pivots on said pivot supporting means, locking compression struts rotatably mounted on said pivots and having operating portions projecting radially inward from the pivots and having locking portions provided with locking surfaces projectable radially outwardly from the pivots, the locking portions of the struts being positionable between the pivots and the shoulder when the members are telescoped, an operator engaging the operating portions of the struts, a spring urging the operator in one direction to rotate the struts on the pivots to move the locking portions inwardly out of the path travelled by the shoulder during relative movement of the telescopable members, and a fluid pressure motor for moving the operator in the opposite direction against the force of the spring to rotate the struts to move the locking portions of the struts into the path of the shoulder, and to position the locking surfaces substantially parallel to the conical surface.

4. A device as defined in claim 3 having a stop for preventing rotation of the struts in the locking direction beyond the position in which the locking surfaces are substantially parallel to the conical surface.

5. An inflation support for a tire comprising in combination a pair of separable telescoping chuck ring members for supporting a tire between them, the chuck ring members and a tire when supported between them forming a container for air under pressure, first locking means attached to one member, a locking ring attached to the other member and including on the inside thereof a hollow conical locking surface, the first locking means being passable through the locking ring when the members are being telescoped, the first locking means including a lock support and a plurality of locks pivoted thereon, each lock having a load bearing compression strut, the locks being located radially inside the path travelled by the conical locking surface as the members are being telescoped and being rotatable to project the compression struts into the path of the conical locking surface between the pivots and the conical locking surface when the members are fully telescoped, and means for pivoting the locks to selectively position the compression struts into and out of the path of the conical locking surface, said compression struts being between the conical locking surface and the pivots when the chuck ring members are locked together, the conical locking surface being sloped away from the pivots in the direction of movement of the chuck ring members in separating, so that pressure in the container tends to pivot the locks to position the compression struts radially outward from points of initial contact between the compression struts and the locking surface.

6. An inflation support for a tire comprising in combination, first and second telescoping chuck members including first and second rings for supporting a tire between them; a circular hollow locking surface on an inner wall of one of the members, the other member including locking means passable through said circular surface when the chuck members are being telescoped, said locking means so passable through said surface including a central portion projectable into said one member when the members are fully telescoped; a plurality of pivots on said central portion having axes disposed in a common plane transverse to the central portion, and a locking member on each pivot, each locking member including a locking portion having one end bearing on a pivot and extending from the pivot toward said circular surface when the members are fully telescoped, said common plane being farther away from the ring on said other chuck member than said circular locking surface when the chuck members are fully telescoped so that separation of the chuck members requires the locking surface to approach the common plane of the pivots and said locking portions being positionable between said pivots and said circular locking surface when said chuck members are fully telescoped; and means for selectively pivoting each of said locking portions between two positions, one position being radially inside the path traversed by the circular locking surface as the members are being telescoped, and the other position being between its pivot and the circular locking surface so that the locking portions when in the second position resist forces exerted toward the plane of the pivots by the circular locking surface.

7. A tire inflation chuck having a central chuck axis and comprising a pair of separable axially telescopic chuck halves having concentric telescoping portions movable into and out of axially overlapped relationship with each other, an annular tire rim engaging surface on each chuck half concentric with the chuck axis, actuatable means for moving said chuck halves relative to each other along said chuck axis between a separated tire receiving position and a telescoped gripping position wherein said rim engaging surfaces are cooperable with each other to sealingly grip the opposed rims of a tire therebetween, an annular locking surface on the telescoping portion of one chuck half concentric with the chuck axis, a plurality of locking dogs mounted on the telescoping portion of the other chuck half in symmetrically disposed relationship about the chuck axis for pivotal movement radially of the chuck axis about individual dog axis lying in a common plane perpendicular to the chuck axis, said common plane of said dog axes being axially offset to one side of said locking surface when said chuck halves are in their separated position and being axially offset to the opposite side of said locking surface when said chuck halves are in their tire gripping position, means for pivoting said dogs about their individual axes between a released position wherein said dogs are radially retracted to permit movement of said telescoping portions of said chuck halves into and out of telescoping relationship with each other and a locking position wherein said dogs project radially from said other chuck half into axial alignment with said locking surface, said dogs when in their locking position being engageable with said locking surface upon a predetermined axial separating movement of said chuck halves from said tire gripping position to prevent further separating movement of said chuck halves.

8. A chuck as defined in claim 7 wherein the telescoping portion on said one chuck member is defined by a central recess and said locking surface is constituted by a shoulder facing inwardly of said recess, the telescoping portion of said other chuck half comprises an axial projection adapted to pass into said recess, and said locking dogs project radially outwardly from said projection when in their locking position.

9. A chuck as defined in claim 7 wherein the telescoping portion of said one chuck half comprises an axial projection secured to and extending outwardly from said one chuck half, said locking surface being located adjacent the outer end of said projection and facing away from said outer end, the telescoping portion on said other chuck half being defined by an axial bore adapted to receive said projection, the dog axes being located radially outwardly of said bore at the side of said other chuck half remote from said one chuck half.

References Cited by the Examiner
UNITED STATES PATENTS

| 2,866,500 | 12/1958 | George et al. | 157—13 |
| 2,890,745 | 6/1959 | Pientkevic | 157—1.2 |
| 2,903,029 | 9/1959 | Twiford | 157—1.2 X |

WILLIAM W. DYER, Jr., *Primary Examiner.*

DONALD R. SCHRAN, *Examiner.*